Dec. 11, 1956 H. ULFFERS 2,773,417
MOTION PICTURE PROJECTOR HOUSING AND LIGHT CONDENSING MEANS
Filed Aug. 6, 1953
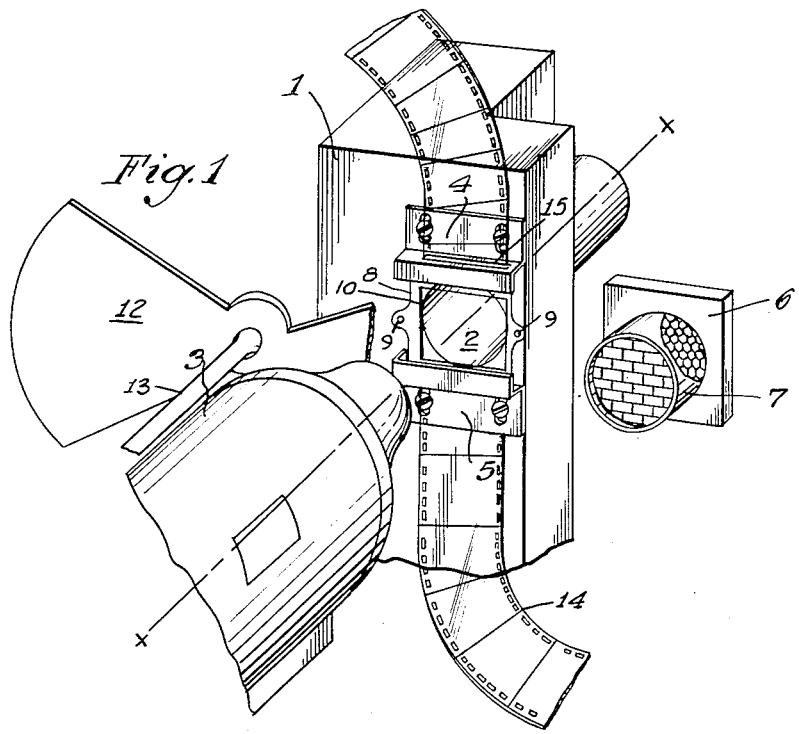
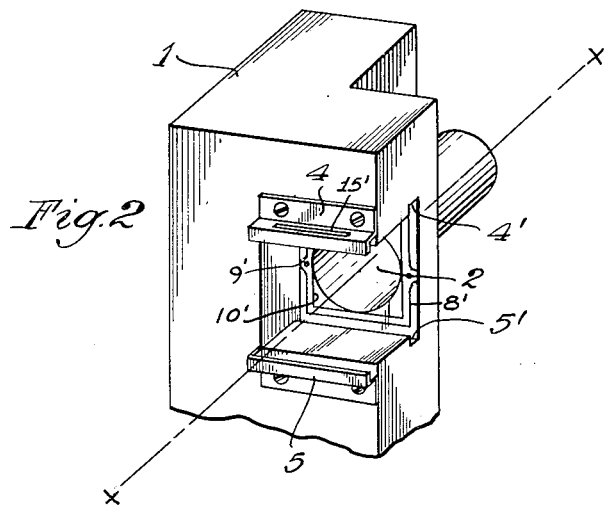
Inventor
Heinz Ulffers
by Singer, Stern & Carlberg
Attorneys

United States Patent Office 2,773,417
Patented Dec. 11, 1956

2,773,417

MOTION PICTURE PROJECTOR HOUSING AND LIGHT CONDENSING MEANS

Heinz Ulffers, Kiel-Wik, Germany, assignor to Zeiss Ikon, A. G., Stuttgart, Stuttgart, Germany Application August 6, 1953, Serial No. 372,785

3 Claims. (Cl. 88—24)

Motion picture projectors for high luminous efficiency comprise, as a rule, two mutually independent parts, namely, the so-called projector head which contains all of the parts essential for guiding the film as well as the rotary shutter and the projector objective, and the illumination device, usually an arc lamp. As an attachment to the illumination device, in many cases a so-called honey-comb condenser has been used which considerably improves the illumination of the projection screen. The honey-comb condenser consists of two lens screens which are disposed in a common frame.

The honey-comb condenser is usually secured to the arc lamp as a part of the illumination device. This arrangement has the disadvantage that for optical reasons, the honey-comb condenser must be provided at a definite distance from the projector opening and must be adjustable in relation thereto both vertically and horizontally. If it is attached to the arc lamp, the distance between said arc lamp and the projector head is also determined by said adjustment.

As it is desirable in many cases to be able to vary said distance, for example, in order to insert a sound aggregate between the lamp house and the projector head, or, in order to adjust the lamp to optimum illumination of the projection screen, the hitherto used arrangement of the honey-comb condenser is not satisfactory. In order to bring the arrangement of the honey-comb condenser into conformity with the above mentioned requirements, the present invention proposes to dispose the honey-comb condenser in the projector head, preferably before the rotary shutter counted in the direction of the beams, and to make it adjustable as a separate unit both vertically and horizontally and also removable from the operator's place, whereby the adjustability of the honey-comb condenser in relation to the projector opening is facilitated at the same time as said condenser is readily accessible, for example, for cleaning purposes. In prior art arrangements of the honey-comb condenser it is accessible through the lamp house only, which is unpleasant, particularly as long as the lamp is still warm.

The honey-comb condenser effects an improved illumination of the picture window. If different picture sizes are to be handled in the same projector, an adaptation of the honey-comb condenser to the momentarily used picture size is necessary. For this purpose the invention provides for an arrangement in which the honey-comb condenser can be secured at different distances from the projector window so that in changing from one picture size to another, one and the same honey-comb condenser can be used in selected positions.

Figures 1 and 2 are two embodiments of the invention shown in perspective in the accompanying drawing.

According to Fig. 1, a bore 2 for the passage of the projection rays emanating from the arc lamp 3 is provided in the projector head 1. A picture window frame 8 is mounted on the projection head in optical alinement with the bore 2 and is secured in place by suitable fasteners 9. Said frame is provided with a projection aperture 10 likewise in optical alinement. The picture window and projection aperture 10 are in alinement along the optical axis x—x, and a blade type shutter 12 is interposed between the arc lamp 3 and the projection head 1. The shutter 12 is mounted on a shaft 13 adapted to be driven by a suitable power shaft (not shown) in synchronism with the picture strip 14 which is fed through the gate in the usual manner by an intermittent grinding gear arrangement (not shown). Above and below said bore 2 and picture window frame 8 are slide guides 4 and 5 adapted to receive a carrier disc 6 for a honey-comb condenser collimating unit 7. The slide guides 4 and 5 are preferably adjustable vertically. The lateral adjustment of the honey-comb condenser may be accomplished through an adjustable abutment (not shown). The slide guides 4 and 5 are provided with picture strip receiving slots 15 to accommodate the picture strip 14 which passes over the picture frame 8. Such an arrangement of the honey-comb condenser collimating unit is preferable in projectors having a drum shutter, and a separate honey-comb condenser with suitably adapted screen division is required for each picture size. However, a blade type shutter has been shown for the purpose of clarity and illustration. For manufacturing reasons this is not always desirable.

According to Fig. 2, the projector head 1 is provided with a picture window frame 8' having a projection aperture 10' fastened in place by threaded fasteners or the like 9' as before. Two pairs of slide guides 4, 5 and 4', 5' are provided in which the honey-comb condenser collimating unit can be selectively disposed in a projector which is adapted for two different picture sizes. This arrangement is preferably used in projectors which are provided with shutters of the type which only require small space in the direction of the optical axis along the line x—x, such as disc or ball shutters the slide guides 4 and 5 in Figure 2 are also provided with picture strip receiving slots 15' as before, or the picture may be slotted to accommodate the picture strip.

What I claim is:

1. In a motion picture projector, comprising a lamp casing and projecting head having a projection aperture therein, said lamp casing and projecting head being arranged independently one from the other in operative optical alinement, and a removable and insertable honey-comb condenser collimating unit supported by the projection head between the projection head and aperture for uniformly illuminating the projection aperture, means on said projection head for supporting said honeycomb condenser collimating unit and arranged in front of the lamp casing, said condenser unit being supported by the projecting head and arranged in front of the projection aperture looking into the direction of the light rays from the lamp casing.

2. A motion picture projector, according to claim 1, characterized, in that the honeycomb condenser collimating unit is arranged as a unit capable of being adjusted by the operator from an external position and adapted to be adjusted in both vertical and lateral directions and may be easily removed.

3. A motion picture projector, according to claim 1, characterized, in that there is provided a plurality of spaced supporting devices in the projector head at the projection aperture supporting the honeycomb condenser unit different distances in front of the projection aperture looking into the direction of the optical axis.

References Cited in the file of this patent

UNITED STATES PATENTS

| | | |
|---|---|---|
| 786,052 | Roebuck | Mar. 28, 1905 |
| 1,032,065 | Kamm | July 9, 1912 |
| 1,146,948 | Patterson | July 20, 1915 |
| 1,255,344 | Segel | Feb. 5, 1918 |
| 2,183,249 | Schering et al. | Dec. 12, 1939 |
| 2,186,123 | Rantsch et al. | Jan. 9, 1940 |
| 2,326,970 | Rantsch | Aug. 17, 1943 |
| 2,456,711 | Knutson et al. | Dec. 21, 1948 |

FOREIGN PATENTS

| | | |
|---|---|---|
| 910,383 | Germany | May 3, 1954 |